United States Patent [19]

Herring

[11] 4,254,737

[45] Mar. 10, 1981

[54] SLOTTED FLOOR SECTION WITH BUILT-IN MEANS ADAPTED FOR HEATING WEANED PIGS IN NURSERY

[76] Inventor: William T. Herring, P.O. Box 181, Newton Grove, N.C. 28366

[21] Appl. No.: 50,066

[22] Filed: Jun. 19, 1979

[51] Int. Cl.³ .............................................. A01K 1/02
[52] U.S. Cl. ..................................................... 119/28
[58] Field of Search ............................. 119/28, 20, 16

[56] References Cited

U.S. PATENT DOCUMENTS

| 3,213,828 | 10/1965 | Sorensen | 119/20 |
|---|---|---|---|
| 3,677,229 | 7/1972 | Blough et al. | 119/16 |
| 3,762,372 | 10/1973 | Mente et al. | 119/28 |
| 3,905,334 | 9/1975 | Stevenson | 119/20 |

Primary Examiner—Hugh R. Chamblee
Attorney, Agent, or Firm—Bell, Seltzer, Park & Gibson

[57] ABSTRACT

Slotted floor sections formed of reinforced concrete and commonly referred to as gang slats, are provided for underlying and serving as a floor for pig nursery pens and wherein conduit means are embeddedly built into respective end sections of the gang slats for circulation of a heated fluid therethrough for applying warmth to the pigs for promoting the health thereof and wherein the respective end sections are accessibly located adjacent the center aisle of the nursery and attract the pigs thereto for thereby aiding in visual inspection of the pigs.

2 Claims, 6 Drawing Figures

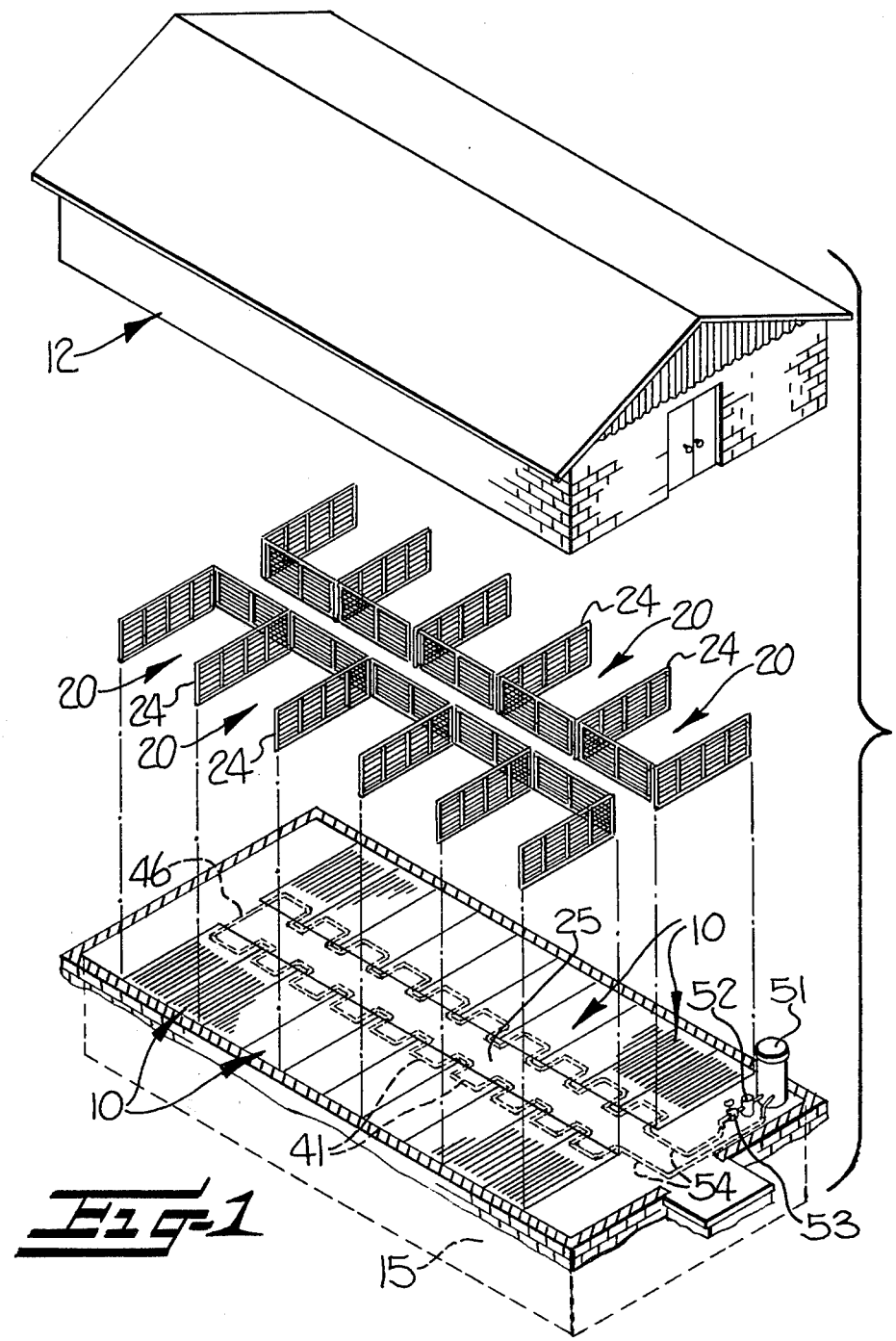

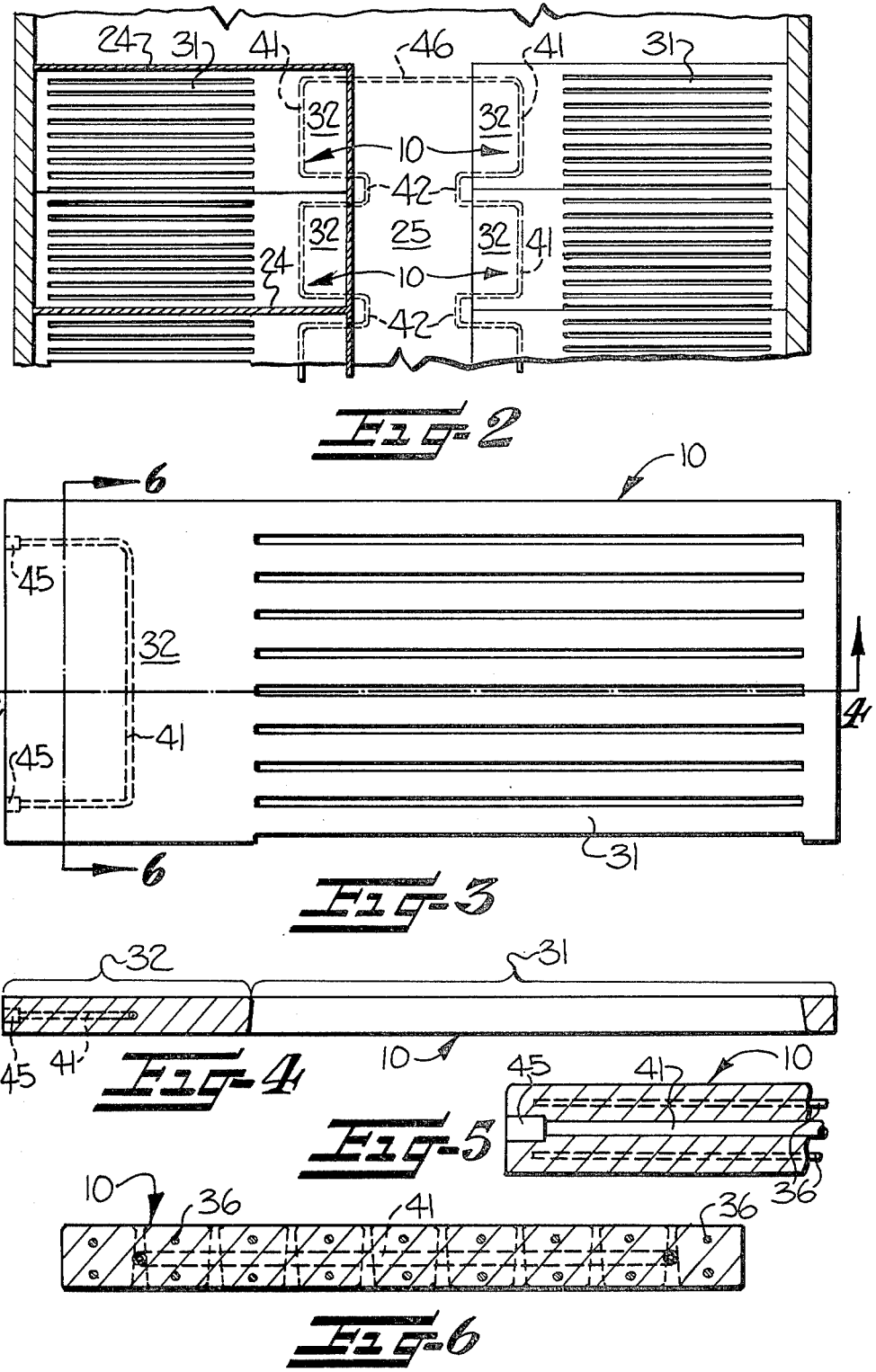

SLOTTED FLOOR SECTION WITH BUILT-IN MEANS ADAPTED FOR HEATING WEANED PIGS IN NURSERY

FIELD OF INVENTION

The present invention relates to flooring for an animal nursery which is adapted for raising weaned pigs, and more particularly concerns slotted floor sections with built-in means for heating the weaned pigs. Specifically, the invention is concerned with reinforced slotted concrete floor sections, which are commonly referred to as gang slats, that underlie and serve as a floor for the pens within the nursery. Each gang slat includes means for heating portions of the gang slat to provide a warm condition conducive to the health and development of the pigs and for attracting the pigs to the heated portions whereby visual inspection of the pigs is facilitated.

BACKGROUND OF THE INVENTION

As the swine production industry has evolved from the status of a supplement to farming, to that of a major enterprise with production in intensified units, modern confinement facilities for the hogs and pigs have been developed. These facilities require the application of increasingly refined principles of breeding, nutrition, physiology, and environmental control so that the hogs can be developed to economically produce maximum quality products. With respect to swine management, the primary object is to minimize environmental factors which are adverse to the swine so as to provide maximum opportunity for survival and growth. It is also necessary to maintain surveillance over the pigs so that adverse health conditions can be detected before spreading to other healthy pigs.

Since the young pigs are weaned at increasingly shorter periods following their birth, critical health problems have developed that reduce the survival rate of the pigs. Particularly, exposure to adverse environmental conditions results in an increasing risk of infection and starvation that reduces the number of pigs that survive for finishing or breeding. Thus, nurseries for raising weaned pigs have been specially adapted to control the climate within the nursery so as to minimize the losses from the litter.

In the usual arrangement for a nursery of this type, two rows of pens are provided along the length of the shelter with the pens placed in a side-by-side arrangement adjacent each other. The pens permit separation of the pigs into small groups to limit animal contact, which inhibits the spread of disease, and to thereby promote the growth and development of the pigs. A center aisle between the rows of pens provides access to the pens and permits visual inspection of the pigs within the pens. The flooring of the shelter, which supports the pens and pigs, is typically raised so as to form a pit beneath the flooring. Furthermore, the flooring is usually slotted to permit passage of the animals' waste through to the pit below. The slotted floors not only reduce or practically eliminate floor cleaning, but also greatly retard the spread of disease and parasites by allowing the rapid removal of excrement the pens. Additionally, the slotted floor is an essential component in controlling the atmospheric environment of the nursery, in that the air is circulated down through the slots to control the temperature and diffusion of odors.

The survival and development of the pigs within the nursery is dependent on proper control of ambient temperatures within the facilities. The younger the pig when weaned, the more dependent it is upon supplemental heat from the environment since young pigs are incapable of maintaining their own body temperature. Typically, it is desirable to maintain a temperature of 75° to 78° F. for the weaned pigs, with the higher temperature being preferred for pigs weaned at earlier ages.

Prior methods of supplying supplemental heat for the weaned pigs have incorporated independent heating systems that direct radiant or convective heat toward the pigs. Thus, in some facilities, heat lamps are positioned above the pens in which the pigs are contained, and the pigs congregate around the areas in which the lamps are directed so as to be warmed thereby. The inefficiency of radiant and convective heat supplied in this manner diminishes the economy of production, and furthermore, maintenance of the desirable temperature is not easily controlled.

Other methods of supplying supplemental heat to the pigs have incorporated systems for heating the entire nursery. As shown in U.S. Pat. No. 4,018,271, to Jones et al., U.S. Pat. No. 3,826,230, to Jones, et al., and U.S. Pat. No. 3,809,014, to Jones et al., these heating systems adapt the flooring of the facility for circulation of a heated fluid therethrough whereby heat is supplied by conduction and radiation. In a typical construction there is provided a slotted floor composed of individual slats positioned in a parallel spaced arrangement and supported at their opposite ends. The slats, which have been formed from precast concrete, aluminum, or thermoplastic materials, include conduits that are embedded within each individual slat for circulation of a heated fluid through the slat. The conduits are interconnected to form a continuous system, and thereby the complete surface of the flooring is heated as heat is conducted from the fluid.

Since the number of pigs in each of the pens in the nursery is deliberately limited to provide room for growth of the pigs and a suitable environment for the development of the pigs, supplying heat to the entire flooring surface of the pens is inefficient and wasteful. Furthermore, with the entire surface of the pen being heated, the complete area is comfortable for the pigs to occupy and they tend to scatter throughout the pen. Thus, visual inspection of the pigs is difficult, and access to the pigs cannot be easily accomplished without entering the pen.

Furthermore, construction of the flooring for nurseries has been substantially simplified with the development in recent years of floor sections containing a plurality of slats and which are integrally formed by casting reinforced concrete. These integral floor sections are commonly referred to as gang slats. The gang slats are supported at opposite ends on the peripheral and center walls of the farrowing house in a manner similar to the installation of the individual slats, but there is an additional advantage in that installation is convenient. So far as can be determined, no one has heretofore provided any type of built-in heating means with gang slats and with which this invention is particularly concerned.

SUMMARY OF THE INVENTION

It is accordingly an object of the present invention to provide a slotted floor section for a pig nursery having built-in means adapted for heating the weaned pigs so as to promote their growth and development.

Another object of the present invention is to provide a nursery for weaned pigs which includes a flooring system that is adapted to maintain sections of the flooring in a warm condition for heating the pigs. In this connection, it is also an object of this invention to provide an integral, reinforced concrete floor section for pens which are contained within the pig nursery, the floor sections being adapted for circulation of a heated fluid within selected portions of the floor section.

It is a further object of the invention to provide a pig nursery for raising weaned pigs that includes a flooring system having means adapted for heating one end portion of each gang slat whereby the pigs are attracted to the end portion so that visual inspection of the pigs congregating on the end portion is facilitated.

These and other objects and advantages of the present invention are achieved in the embodiments illustrated herein by the provision of an animal nursery for raising weaned pigs, wherein there is provided a plurality of nursery pens arranged in opposing rows and adapted for confining pigs therein. A center aisle is disposed between the opposing rows of pens for access to the pens.

A plurality of floor sections or gang slats are arranged in corresponding rows to underlie and support the pens. Each gang slat is formed from reinforced concrete and includes an end portion adjacent the center aisle. The gang slats also have a plurality of slots through which the pigs' waste can pass to a pit below.

Embedded within one end portion of each gang slat is conduit means for circulation of a heated fluid through the end portion to aid in maintaining surfaces of the end portion in a warm condition conducive to the health and development of the pigs. The heat provided by the circulation of the heated fluid through the conduit means also serves to attract the pigs to the end portion whereby visual inspection from the center aisle of the pigs congregating on the end portion is facilitated. Heat exchanger means connected to the conduit means supplies the heated fluid for circulation through the conduit means, and means for transmitting the heated fluid to the conduit means and for returning the heated fluid to the heat exchanger means after dissipation of the heat from the fluid are also provided.

BRIEF DESCRIPTION OF THE DRAWINGS

Some of the objects and advantages of the invention having been stated, others will appear as the description proceeds, when taken in connection with the accompanying drawings, in which—

FIG. 1 is an exploded perspective view of a pig nursery embodying the features of the present invention;

FIG. 2 is a sectional view of a portion of the pig nursery shown in FIG. 1, and illustrating the positional arrangement of the pens with respect to the gang slats;

FIG. 3 is a top view of one of the gang slats;

FIG. 4 is a longitudinal sectional view of the gang slat shown in FIG. 3 and taken substantially along the line 4—4 of FIG. 3;

FIG. 5 is a sectional view of the end of the gang slat and illustrating the conduit means; and FIG. 6 is a transverse sectional view of the gang slat shown in FIG. 3 and taken substantially along the line 6—6 of FIG. 3.

DESCRIPTION OF THE ILLUSTRATED EMBODIMENT

Referring more specifically to the drawings, the illustrated embodiment of the slotted floor sections, which are commonly referred to as gang slats, is indicated generally at 10, and as shown in FIG. 1, the gang slats are adapted for installation in an animal shelter or nursery 12 for weaned pigs. The nursery 12 is provided with peripheral center foundation walls, not shown, that extend longitudinally along the length of the nursery, and the gang slats 10 are supported at their opposite ends by the associated foundation walls and are positioned adjacent each other in opposing rows that extend along the length of the nursery 12. Pits 15 are formed below the gang slats 10 and between the foundation walls for purposes of collection of the pigs' waste as further described below.

The nursery 12 also includes a plurality of pens 20 for confinement of the weaned pigs, and the pens are arranged in opposing rows along the length of the nursery 12, in a similar manner as the rows of gang slats 10. A fence section 24 separates the pens 20 from each other and serves to limit contact between the pigs to retard the spread of contagious diseases and to promote the health and development of the pigs. A center aisle 25 is disposed between the opposing rows of pens 20 for ready access thereto.

As illustrated in FIGS. 1 and 2, the pens 20 are positioned in opposing rows on the gang slats 10 with the pens typically corresponding to two adjacent gang slats. Thus, the gang slats 10 serve as a floor for the pens 20 to support the pigs, each pen having a floor comprising two adjacent gang slats.

The gang slat 10, formed from reinforced concrete, has a slotted main body section 31 and an end section 32. The end section 32 serves as an area on which the pigs can comfortably lie and is illustrated as being positioned adjacent the center aisle 25. Further the main body section 31 is substantially greater than half the overall length of the gang slat 10 and supports the pigs for habitation in the pens 20.

For facilitating removal of the pigs' waste, a plurality of longitudinally extending slots 33 are provided in portions of the gang slat 10. In the illustrated gang slat 10, the slots 33, which are typically ⅜ inch wide, are positioned within the main body section 31 and extend over substantially the entire length of the main body section. Thus, the waste is readily removed from the surface of the main body section 31 by the movement of the pigs thereon, which forces the waste through the slots to be readily deposited into the pit 15 below. Also, the end section 32 is typically devoid of slots so that the solid surface can provide the area on which the pigs comfortably lie.

As indicated earlier, the gang slat 10 is integrally formed from reinforced concrete. Thus, the end section 32 and main body section 31 of the gang slat are integrally formed with each other. To provide the desired structural strength to the gang slat 10, reinforcing rods 36 are arranged in upper and lower networks and embedded within the gang slat 10, as best shown in FIG. 5. Predominantly, the reinforcing rods 36 extend longitudinally of the gang slat and within the slat portions thereof between slots 33 and also in end section 32. Reinforcing rods, not shown, are also conventionally positioned transversely within the ends of the gang slat including end section 32 for the purpose of providing further strength to the gang slat.

Associated with each of the gang slats 10 is means for circulation of a heated fluid therethrough, which aids in maintaining surfaces of each end section 32 in a warm condition conducive to the health and development of the pigs and for attracting the pigs to the end section. In this manner, heat is radiated toward the pigs or conducted to the pigs when they are in contact with surfaces of the end sections 32. The means for circulation of the heated fluid comprises conduit means 41 embedded within only the end sections 32 of the gang slats and is in the form of a U-shaped loop of conduit extending substantially throughout the width of the gang slat. Furthermore, as best shown in FIG. 5, the upper and lower networks of reinforcing rods 36 are respectively positioned above and below the embedded conduit means 41 so as not to obstruct the conduit means while strenghtening the gang slat 10.

The ends of the conduit means 41 in the end sections 32 are defined by female connections 45 which are accessible at the end of the gang slat adjacent the center aisle 25 for connection in a desired manner. Thus, as shown in FIG. 5, the female connections 45 are shown with a larger diameter than the remainder of the conduit means 41. Conduit means 42 positioned in the center aisle 25 interconnect the conduit means 41 embedded within the end sections 32 and define a system for circulation of heated fluid sequentially through the end sections 32.

As best shown in FIGS. 1 and 2, for connecting the conduit means 41 in the gang slats on one side of the aisle with the conduit means in the gang slats on the other side of the aisle, a conduit section 46 is provided which spans across the far end of the center aisle 25. For connecting the conduit means in the respective opposing rows of gang slats to fluid flow components, such as heat exchanger means 51, pump 52, and valve means 53, other conduit sections 54 are provided which, as illustrated in FIG. 1, are embedded within the center aisle 25 and extend from and to the aforementioned associated fluid flow components.

Heat exchanger means 51, typically comprising a conventional hot water heater, is connected to the conduit means 41 and is adapted to supply heated fluid for circulation through the conduit means. There is also provided means for transmitting heated fluid to the conduit means 41 and for returning heated fluid to the heat exchanger means 51 after dissipation of heat from the fluid. The means for transmitting and returning heated fluid includes a conventional water pump 52 connected to the heat exchanger means 51. Valve means 53 is also included and connected to the heat exchanger means 51 and pump 52 for controlling the rate at which heated fluid is circulated through the conduit means 41, and thereby, the temperature to which surfaces of the end sections 32 are heated.

During construction of the nursery 12, the center aisle 25 is formed from poured concrete after the gang slats 10 are in place on the foundation walls and after the conduit means 41 within the end sections 32 are connected. In this manner, conduit means 42 and the sections of conduit 46 and 54 are embedded within the concrete forming the center aisle 25 and do not obstruct passage to and from the pens 20.

By the provision of conduit means 41 in only the end sections 32 of the gang slats 10, the heating system for the nursery can be operated to conserve hot water since only portions of the flooring are heated. Thus, the pigs are provided with adequate supplemental heat from the end sections and can comfortably lie on the surface of the end sections. In addition, the heat supplied by circulation of the heated fluid in the end sections serves to attract the pigs thereto. Visual inspection of the pigs from the center aisle 25 is thereby facilitated since the pigs on the end portion are readily accessible.

In the drawings and specification, there has been set forth a preferred embodiment of the invention and although specific terms are employed, they are used in a generic and descriptive sense only and not for purposes of limitation.

That which is claimed is:

1. In an animal nursery for raising weaned pigs, wherein there is provided a plurality of nursery pens arranged in opposing rows and being adapted for confining pigs therein, and wherein there is further provided a center aisle disposed between said opposing rows for access to said pens, the combination therewith of a plurality of reinforced concrete slotted floor sections, commonly referred to as gang slats, arranged in corresponding rows underlying said pens and serving as a floor therefor, each gang slat including upper and lower networks of reinforcing rods embedded within said gang slat, each gang slat also having a plurality of slots therein extending substantially greater than half the overall length of the gang slat for passage of the pigs' waste therethrough and further including a predetermined solid section devoid of slots adjacent said center aisle defining an end portion of the gang slat and serving as an area on which the pigs can comfortably lie, means associated with each of said gang slats for circulation of a heated fluid therethrough and comprising conduit means embedded within only said solid end section of each gang slat for circulation of a heated fluid therethrough so as to aid in maintaining surfaces of said end section in a warm condition conducive to the health and development of the pigs and for attracting the pigs to that end section whereby visual inspection from said center aisle of the pigs congregating on said end section is facilitated; said conduit means in each gang slat being positioned between said upper and lower networks of reinforcing rods and including female connections defining spaced apart entrance and exit ends both accessibly positioned in the end of said solid end section adjacent the aisle for facilitating interconnection of said conduit means in the gang slats, and said female connections being entirely embedded within the end section so as not to project outwardly from the gang slat, heat exchanger means for supplying heated fluid for circulation through said conduit means; and means interposed between said heat exchanger means and said conduit means for circulating heated fluid to said conduit means and for returning heated fluid to said heat exchanger means after dissipation of heat therefrom.

2. An integrally formed reinforced concrete slotted floor section, commonly referred to as a gang slat, adapted to be arranged in rows to serve as a floor for a nursery pen in a pig nursery and comprising upper and lower networks of reinforcing rods embedded within said concrete gang slat, said gang slat having a plurality of slots extending substantially greater than half the overall length of the gang slat for passage of the pigs' waste therethrough, a solid end section devoid of slots defining an end portion of the gang slat and serving as an area on which the pigs can comfortably lie, and means associated with said gang slat for circulation of a heated fluid therethrough and comprising conduit means embedded within only said solid end section of the gang slat for circulation of a heated fluid therethrough so as to aid in maintaining surfaces of said end section in a warm condition conducive to the health and development of the pigs and for attracting the pigs to that end section whereby visual inspection of the pigs is facilitated; said conduit means being positioned between said upper and lower networks of reinforcing rods and including female connections defining spaced apart entrance and exit ends both accessibly positioned in the end of said solid end section to facilitate connection in a desired manner, and said female connections being entirely embedded wthin the end section so as not to project outwardly from the gang slat.

* * * * *